US011868426B2

(12) United States Patent
Martin et al.

(10) Patent No.: US 11,868,426 B2
(45) Date of Patent: *Jan. 9, 2024

(54) HARDWARE IMPLEMENTATION OF CONVOLUTIONAL LAYER OF DEEP NEURAL NETWORK

(71) Applicant: Imagination Technologies Limited, Kings Langley (GB)

(72) Inventors: Chris Martin, Leighton Buzzard (GB); David Hough, Watford (GB); Clifford Gibson, Wheathampstead (GB); Daniel Barnard, Berkhamsted (GB)

(73) Assignee: Imagination Technologies Limited, Kings Langley (GB)

( * ) Notice: Subject to any disclaimer, the term of this patent is extended or adjusted under 35 U.S.C. 154(b) by 21 days.

This patent is subject to a terminal disclaimer.

(21) Appl. No.: 17/510,633

(22) Filed: Oct. 26, 2021

(65) Prior Publication Data

US 2022/0043886 A1 Feb. 10, 2022

Related U.S. Application Data

(63) Continuation of application No. 17/165,014, filed on Feb. 2, 2021, now Pat. No. 11,157,592, which is a (Continued)

(30) Foreign Application Priority Data

Nov. 3, 2017 (GB) .................................... 1718297

(51) Int. Cl.
*G06F 17/15* (2006.01)
*G06N 3/063* (2023.01)
(Continued)

(52) U.S. Cl.
CPC .......... *G06F 17/153* (2013.01); *G06F 7/5443* (2013.01); *G06N 3/04* (2013.01); *G06N 3/063* (2013.01); *G06N 3/045* (2023.01)

(58) Field of Classification Search
CPC ....... G06F 17/153; G06F 7/5443; G06N 3/04; G06N 3/063; G06N 3/045
See application file for complete search history.

(56) References Cited

U.S. PATENT DOCUMENTS 9,710,265 B1 7/2017 Temam et al.
9,805,304 B2 10/2017 Ross
(Continued)

FOREIGN PATENT DOCUMENTS

GB 2552243 A 1/2018
GB 2554711 A 4/2018

OTHER PUBLICATIONS

Park, Hyunsun, et al. "Zero and data reuse-aware fast convolution for deep neural networks on GPU." Proceedings of the Eleventh IEEE/ACM/IFIP International Conference on Hardware/Software Codesign and System Synthesis. 2016. (Year: 2016).*
(Continued)

*Primary Examiner* — Eric Nilsson
(74) *Attorney, Agent, or Firm* — Potomac Law Group, PLLC; Vincent M DeLuca

(57) ABSTRACT

Hardware implementations of, and methods for processing, a convolution layer of a DNN that comprise a plurality of convolution engines wherein the input data and weights are provided to the convolution engines in an order that allows input data and weights read from memory to be used in at least two filter-window calculations performed either by the same convolution engine in successive cycles or by different convolution engines in the same cycle. For example, in some hardware implementations of a convolution layer the convolution engines are configured to process the same weights
(Continued)

but different input data each cycle, but the input data for each convolution engine remains the same for at least two cycles so that the convolution engines use the same input data in at least two consecutive cycles.

20 Claims, 10 Drawing Sheets

Related U.S. Application Data continuation of application No. 16/179,270, filed on Nov. 2, 2018, now Pat. No. 10,942,986.

(51) Int. Cl.
    *G06F 7/544*     (2006.01)
    *G06N 3/04*     (2023.01)
    *G06N 3/045*     (2023.01)

(56) References Cited

U.S. PATENT DOCUMENTS

2017/0316312 A1   11/2017  Goyal et al.
2017/0344876 A1   11/2017  Brothers
2018/0136872 A1*  5/2018  Du ........................ G06F 17/153
2018/0357532 A1   12/2018  Inoue
2019/0026078 A1*  1/2019  Bannon .................... G06F 7/50

OTHER PUBLICATIONS

Rajeswar et al., "Scaling up The Training of Deep CNNs for Human Action Recognition," 2015 IEEE Int'l Parallel and Distributed Processing Symposium Workshop, IEEE Computer Society 2015, pp. 1172-1177.

Song et al., "C-Brain: A Deep Learning Accelerator that Tames the Diversity of CNNs through Adaptive Data-level Parallelization," Proceedings of the 53rd Annual Design Automation Conference, 2016.

Podili et al., "Fast and Efficient Implementation of Convolutional Neural Networks on FPGA," 2017 IEEE 28th International Conference on Application-specific Systems, Architectures and Processors, 2017.

Note: copies of NPL in parent application).

* cited by examiner

| Cycle | CE1 | CE2 | CE3 | CE4 |
|---|---|---|---|---|
| 1 | F1, W1 | F1, W2 | F1, W3 | F1, W4 |
| 2 | F2, W1 | F2, W2 | F2, W3 | F2, W4 |
| 3 | F3, W1 | F3, W2 | F3, W3 | F3, W4 |
| 4 | F1, W5 | F1, W6 | F1, W7 | F1, W8 |
| 5 | F2, W5 | F2, W6 | F2, W7 | F2, W8 |
| 6 | F3, W5 | F3, W6 | F2, W7 | F3, W8 |

FIG. 7

HARDWARE IMPLEMENTATION OF CONVOLUTIONAL LAYER OF DEEP NEURAL NETWORK

CROSS-REFERENCE TO RELATED APPLICATIONS AND CLAIM OF PRIORITY

This application is a continuation under 35 U.S.C. 120 of application Ser. No. 17/165,014 filed Feb. 2, 2021, now U.S. Pat. No. 11,157,592, which is a continuation of prior application Ser. No. 16/179,270 filed Nov. 2, 2018, now U.S. Pat. No. 10,942,986, which claims foreign priority under 35 U.S.C. 119 from United Kingdom Application No. 1718297.3 filed Nov. 3, 2017.

BACKGROUND

A Deep Neural Network (DNN) is a type of artificial neural network that can be used for machine learning applications. In particular, a DNN can be used in signal processing applications, including image processing and computer vision applications.

DNNs have been implemented in applications where power resources are not a significant factor. Despite this, DNNs have application in a number of different technical fields in which the resources of the hardware used to implement the DNNs is such that power consumption, processing capabilities, or silicon area are limited.

There is therefore a need to implement hardware that is configured to implement a DNN (or at least part thereof) in an efficient manner, i.e. in a manner that requires less silicon area or less processing power when operating. Moreover, DNNs can be configured in a number of different ways for a variety of different applications. There is therefore also a need for hardware for implementing a DNN to be flexible to be able to support a variety of DNN configurations.

The embodiments described below are provided by way of example only and are not limiting of implementations which solve any or all of the disadvantages of known hardware implementations of a deep neural network (or a part thereof).

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are hardware implementations, and methods for processing, a convolution layer of a DNN that comprise a plurality of convolution engines wherein the input data and weights are provided to the convolution engines in an order that allows input data and weights read from memory to be used in at least two filter-window calculations performed either by the same convolution engine in successive cycles or by different convolution engines in the same cycle. For example, in some hardware implementations of a convolution layer the convolution engines are configured to process the same weights but different input data each cycle, but the input data for each convolution engine remains the same for at least two cycles so that the convolution engines use the same input data in at least two consecutive cycles.

A first aspect provides a hardware implementation of a convolution layer of a deep neural network, the hardware implementation comprising: a plurality of convolution engines, each convolution engine comprising hardware logic configured to receive in each of a plurality of cycles a set of weights and a set of input data values, and perform a multiply accumulate operation on the set of weights and the set of input data values; wherein in any cycle the convolution engines receive the same set of weights and different sets of input data values, and the convolution engines receive the same sets of input data values in at least two consecutive cycles.

A second aspect provide a method of providing weights and input data values to a plurality of convolution engines of a hardware implementation of a convolution layer of a deep neural network, each convolution engine comprising hardware logic configured to perform a multiply accumulate operation on a set of weights and a set of input data values, the method comprising providing a plurality of weights and a plurality of input data values to the convolution engines over a plurality of cycles, wherein in any cycle the convolution engines are provided the same set of weights and different sets of input data values, and the convolution engines are provided the same sets of input data values in at least two consecutive cycles.

A third aspect provides a hardware implementation of a deep neural network comprising the hardware implementation of the convolutional layer of the first aspect.

The hardware implementation of a convolutional layer of a DNN may be embodied in hardware on an integrated circuit. There may be provided a method of manufacturing, at an integrated circuit manufacturing system, the hardware implementation. There may be provided an integrated circuit definition dataset that, when processed in an integrated circuit manufacturing system, configures the system to manufacture the hardware implementation of a convolutional layer of a DNN. There may be provided a non-transitory computer readable storage medium having stored thereon a computer readable description of a hardware implementation of a convolutional layer of a DNN that, when processed in an integrated circuit manufacturing system, causes the integrated circuit manufacturing system to manufacture an integrated circuit embodying a hardware implementation of a convolutional layer of a DNN.

There may be provided an integrated circuit manufacturing system comprising: a non-transitory computer readable storage medium having stored thereon a computer readable description of the hardware implementation of a convolution layer of a DNN; a layout processing system configured to process the computer readable description so as to generate a circuit layout description of an integrated circuit embodying the hardware implementation of a convolution layer of a DNN; and an integrated circuit generation system configured to manufacture the hardware implementation of a convolution layer of a DNN according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 7 is a schematic diagram of a chart illustrating example weights and input data values provided to a plurality of convolution engines over a plurality of cycles;

Figure 1:
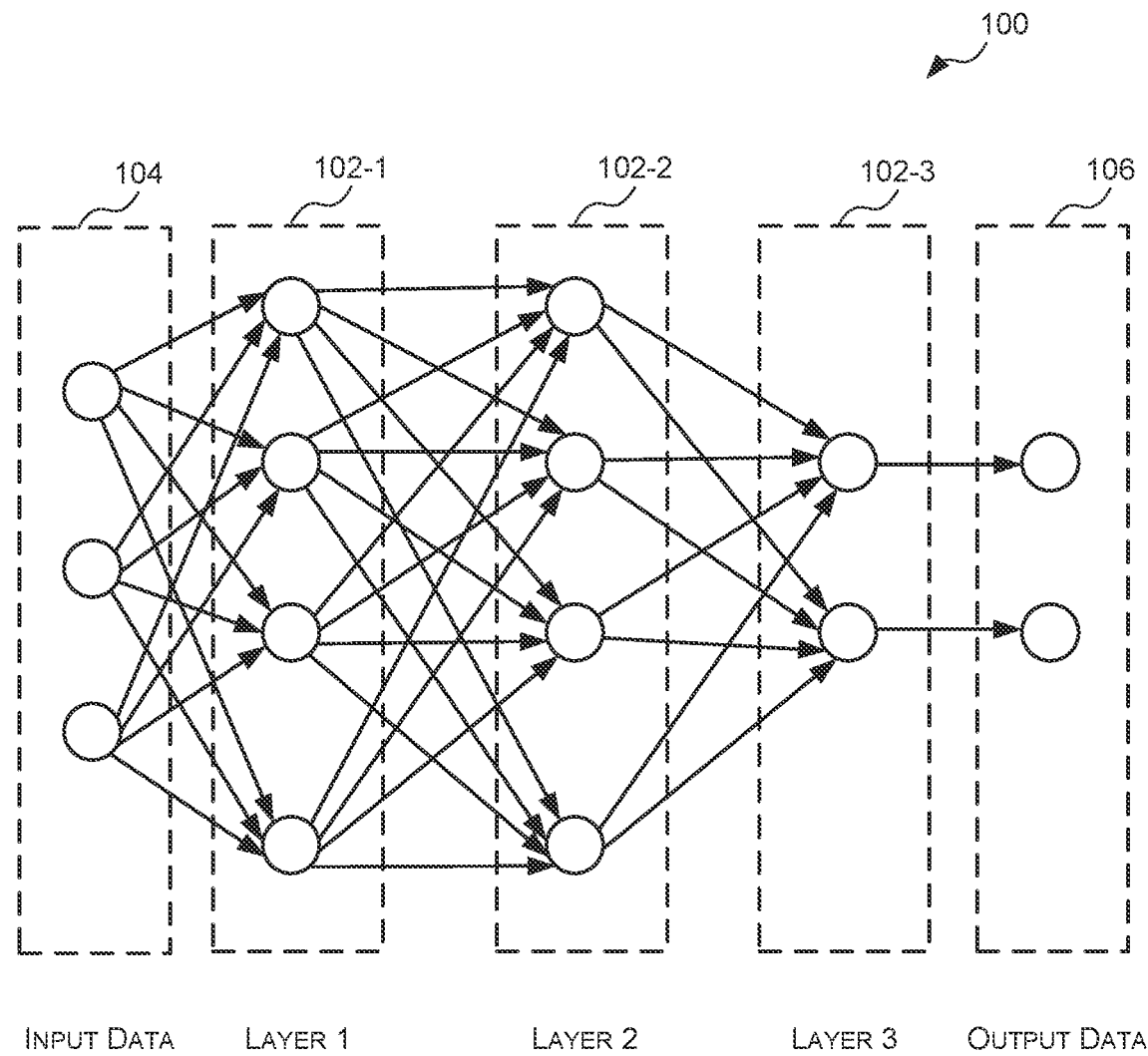
FIG. 1 is a schematic diagram of an example deep neural network (DNN)

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A Deep Neural Network (DNN) is a form of artificial neural network comprising a plurality of interconnected layers that enable the DNN to perform signal processing tasks, including, but not limited to, computer vision tasks. FIG. 1 illustrates an example DNN 100 that comprises a plurality of layers 102-1, 102-2, 102-3. Each layer 102-1, 102-2, 102-3 receives input data, processes the input data in accordance with the layer to produce output data. The output data is either provided to another layer as the input data, or is output as the final output data of the DNN. For example, in the DNN 100 FIG. 1 the first layer 102-1 receives the original input data 104 to the DNN 100 and processes the input data in accordance with the first layer 102-1 to produce output data. The output data of the first layer 102-1 becomes the input data to the second layer 102-2 which processes the input data in accordance with the second layer 102-2 to produce output data. The output data of the second layer 102-2 becomes the input data to the third layer 102-3 which processes the input data in accordance with the third layer 102-3 to produce output data. The output data of the third layer 102-3 is output as the output data 106 of the DNN.

The processing that is performed on the input data to a layer depends on the type of layer. For example, each layer of a DNN may be one of a plurality of different types. Example DNN layer types include, but are not limited to: a convolution layer, an activation layer, a normalisation layer, a pooling layer and a fully connected layer. It will be evident to a person of skill in the art that these are example DNN layer types and that this is not an exhaustive list and there may be other DNN layer types.

A convolution layer is configured to convolve the input data using weights associated with that layer. Specifically, each convolution layer is associated with a plurality of weights $w_1 \ldots w_9$ which may also be referred to as filter weights or coefficients. The weights may be grouped to form or define one or more filters or kernels.

Figure 2:
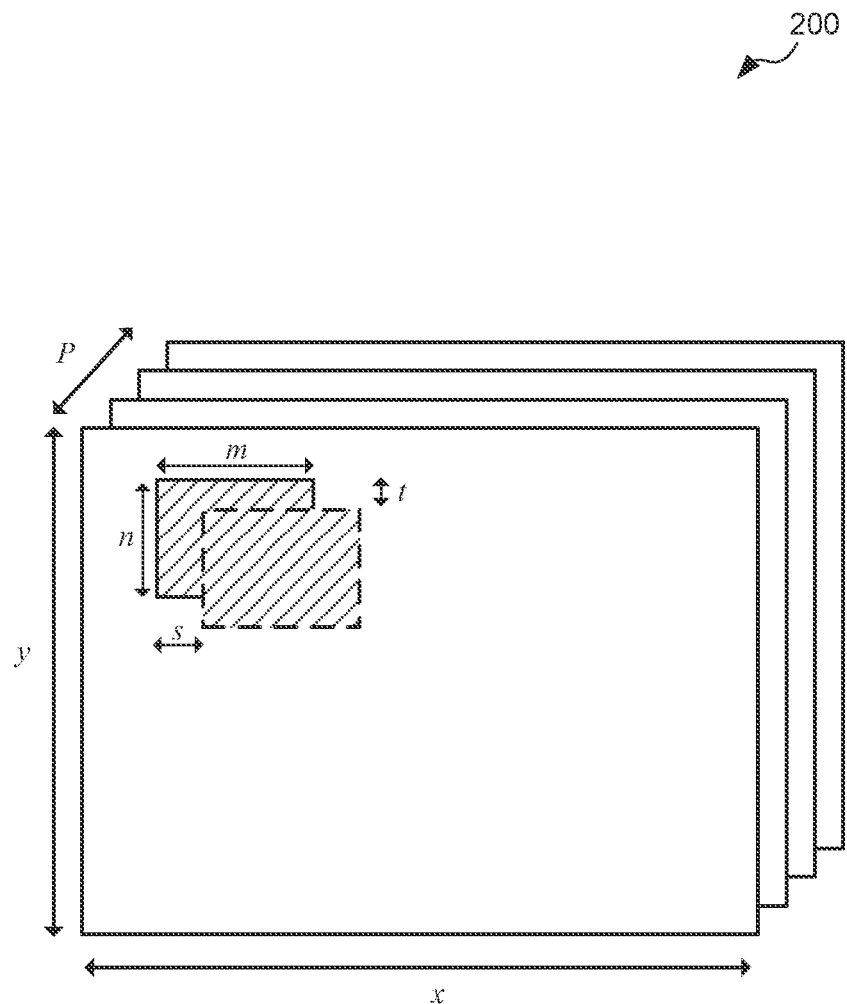
FIG. 2 is a schematic diagram of example data in a DNN.

Reference is made to FIG. 2 which illustrates an example of the format of data 200 utilised in a DNN. As can be seen in FIG. 2, the data 200 used in a DNN may be arranged as P planes of data, where each plane has a dimension x×y. A DNN may comprise one or more convolution layers each of which is associated with a plurality of filters each of which comprises a plurality of weights. Each filter has a dimension m×n×P (i.e. each filter comprises a set of m×n×P weights w) and is applied to the input data according to a convolution operation across several steps in direction s and t, (which are referred to as windows) as illustrated in FIG. 2. Each filter produces one output plane. The number of filters and the number of weights per filter may vary between convolution layers. A convolutional neural network (CNN), which is a specific type of DNN that is effective for image recognition and classification, generally comprises a plurality of convolution layers.

A hardware implementation of a convolution layer may comprise a hardware module or block (which may be referred to herein as a convolution engine) that is configured to calculate the sum of the products between the weights forming all or portion of a filter and input data values forming all or portion of a window (which may be referred to as a filter-window calculation). Since there are typically a high number of such filter-window calculations that are performed, some hardware implementations may comprise a plurality of such convolution engines so that more than one filter-window calculation can be performed in parallel. Preparing each convolution engine to perform a filter-window calculation involves reading the appropriate input data and weights for each filter-window calculation from memory and providing it to one of the convolution engines. There is typically a large amount of data that is transferred form the memory to the convolution engines, which, if not done efficiently, can result in a high memory bandwidth required, and high-power consumption, for providing the input data and weights to the convolution engines.

Accordingly described herein are hardware implementations of, and methods for processing, a convolution layer of a DNN that comprise a plurality of convolution engines in which the input data and weights are provided to the convolution engines in an efficient manner to reduce the memory bandwidth required for, and power consumed by, providing the input data and weights to the convolution engines. Specifically, in the hardware implementations and methods described herein the input data and weights are provided to the convolution engines in an order that allows input data and weights read from memory to be used in at least two filter-window calculations performed either by the same convolution engine in successive cycles or by different convolution engines in the same cycle. For example, in some hardware implementations of a convolution layer the convolution engines are configured to receive the same weights but different input data each cycle, but the convolution engines receive the same input data in at least two consecutive cycles. By reusing input data and weights once they have been read from memory, the number of memory reads that are performed may be reduced which may reduce the memory bandwidth requirement and power consumption.

Figure 3:
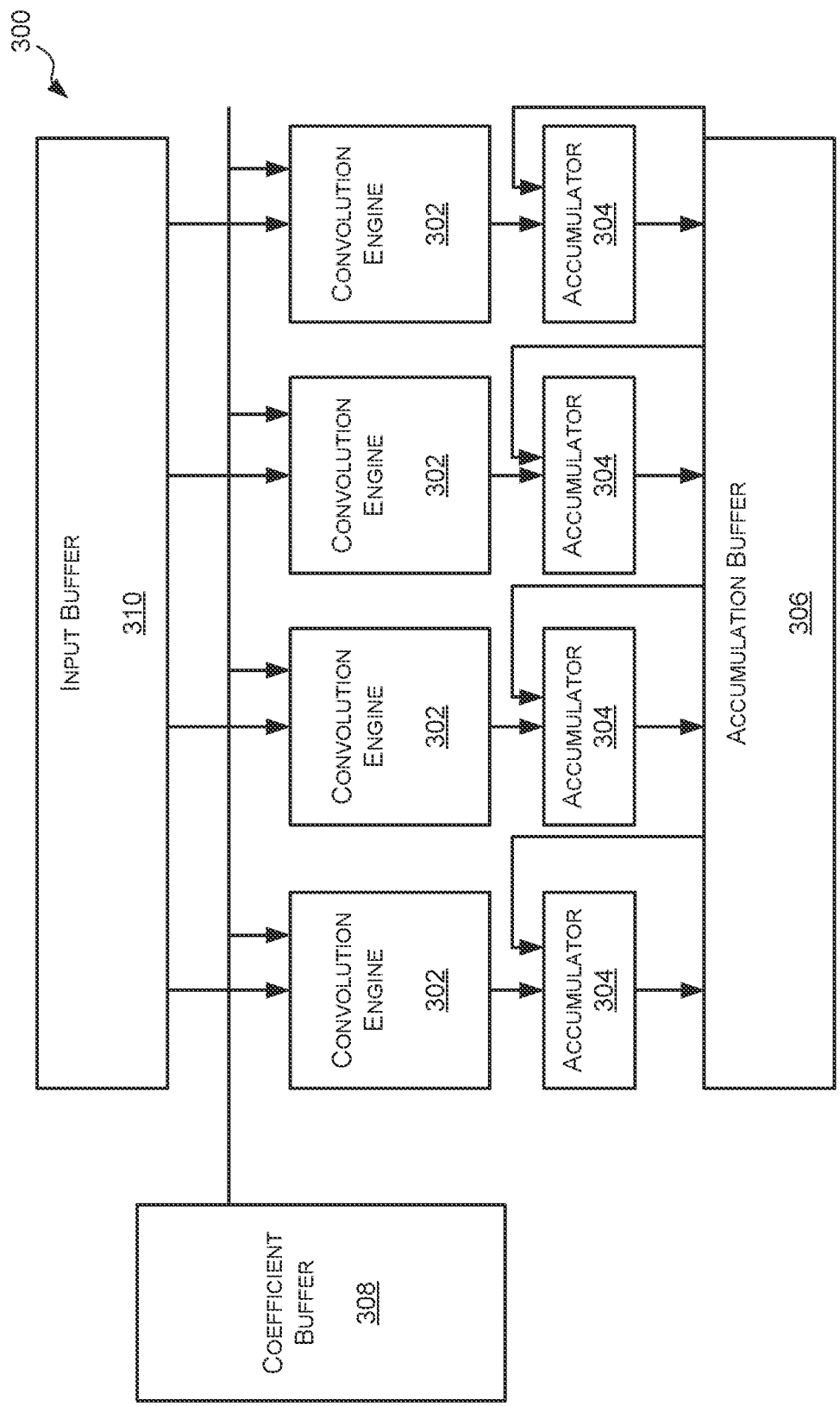
FIG. 3 is a block diagram of an example hardware implementation of a convolution layer of a DNN.

Reference is now made to FIG. 3 which illustrates an example hardware implementation of a convolution layer of a DNN 300. The hardware implementation 300 comprises a plurality of convolution engines 302, a plurality of accumulators 304, an accumulation buffer 306, a coefficient buffer 308, and an input buffer 310.

Figure 4:
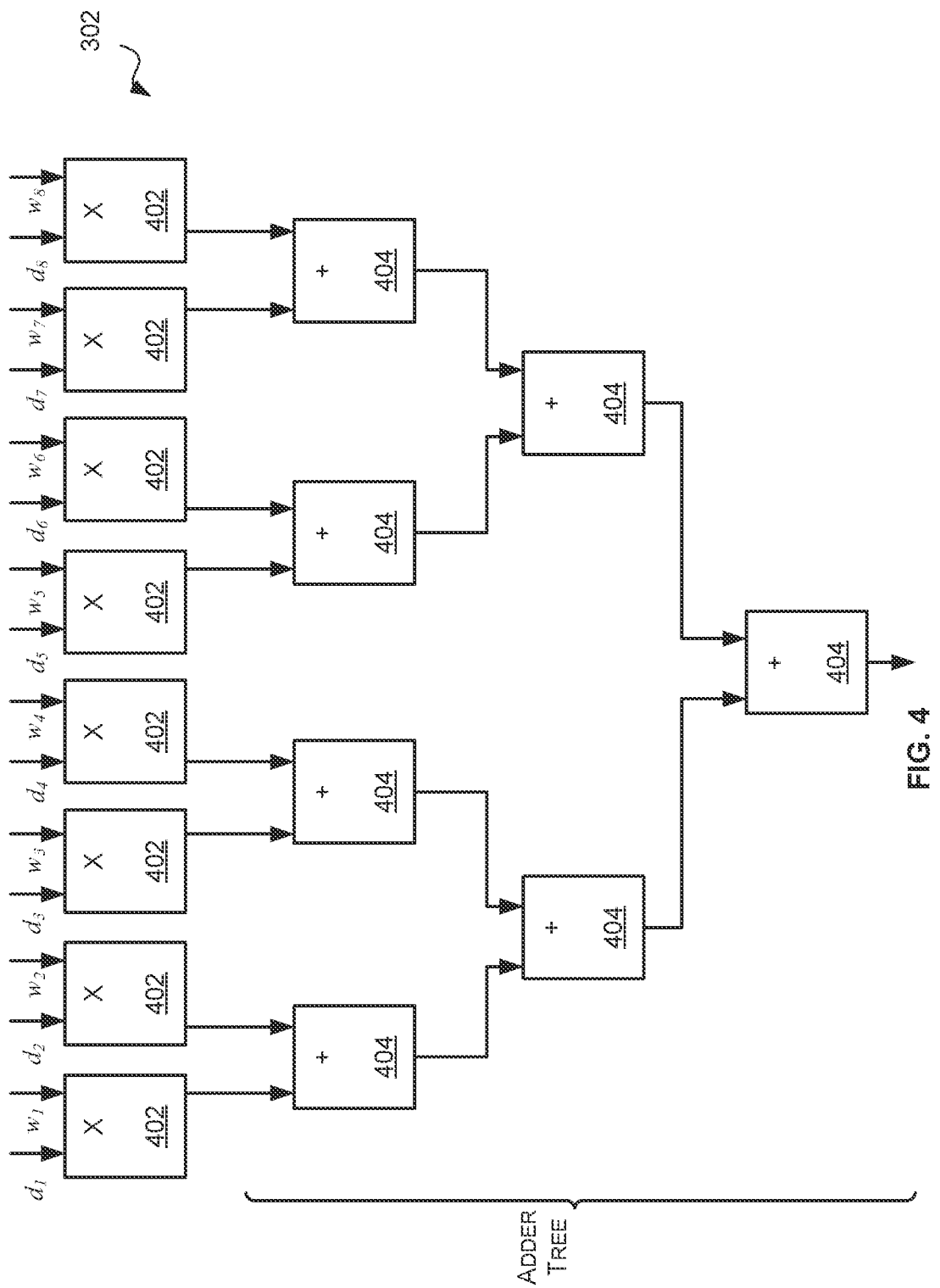
FIG. 4 is a block diagram of an example convolution engine of FIG. 3.

Each convolution engine 302 comprises hardware logic configured to receive a set of weights $\{w_1 \ldots w_8\}$ that represent all or a portion of a filter, and a set of input data values $\{d_1 \ldots d_8\}$ that represent all or a portion of a window, and perform a multiply-accumulate calculation on the received weights and input data values. In some examples, as shown in FIG. 4, each convolution engine 302 may comprise a plurality of multipliers 402, each of which is configured to multiply a weight ($w_i$) and a corresponding input data value ($d_i$) to produce a multiplication output value. The multipliers 402 are followed by a plurality of adders 404 that form an adder tree to calculate the sum of the multiplication outputs. In the example of FIG. 4 the convolution engine 302 comprises eight multipliers 402, but in other examples there may be more or fewer multipliers. For example, in some cases there may be 128 multipliers. Generally, if there are Z multipliers 402 the adder tree comprises Z–1 adders 404.

In some cases, the multiply-accumulate calculation is pipelined. For example, the multipliers 402 and adders 404 may be divided into a number of pipeline stages with a register stage (not shown) before the first pipeline stage and between each pair of pipeline stages. For example, the multipliers may form a first pipeline stage and the adders may be divided into layers wherein the subsequent pipeline stages comprise one or more layers of adders.

The example hardware implementation 300 of FIG. 3 comprises four convolution engines 302, however, it will be evident to a person of skill in the art that the methods and principles described herein are applicable to hardware implementations with at least two convolution engines.

Since it may take more than one hardware pass of a convolution engine to generate a complete filter result (e.g. because a convolution engine may only receive and process a portion of the weights of a filter and/or a portion of the input data values of a window in a cycle) the hardware implementation may comprise a plurality of accumulators 304. Each accumulator 304 receives the output of one convolution engine 302 and adds the output to the previous convolution engine output that relates to the same filter. Since the convolution engine may not generate or produce outputs that relate to the same filter in consecutive cycles the partial results of one or more filters may be stored in an accumulation buffer 306 and then the appropriate partial result may be provided to the accumulator each cycle by the accumulation buffer 306. In some examples, the accumulation buffer 306 may be able to store partial results related to 128 different filters.

The coefficient buffer 308 comprises memory (not shown) to store a plurality of weights related to a convolution layer (or fully connected layer) of a DNN and hardware logic (not shown) to provide the weights to the convolution engines 302 for processing in a predetermined order over a plurality of cycles. The plurality of weights may comprise all of the weights related to the convolution layer or only a portion of the weights related to a convolution layer. In the examples described herein the coefficient buffer 308 is configured to provide the same set of weights to all convolution engines each cycle. Specifically, the coefficient buffer 308 is configured to output, each cycle, one set of weights which represents all or part of a filter, which is provided to all convolution engines 302. For example, the coefficient buffer 308 may be configured to provide a set of weights that represent all or part of a first filter to all convolution engines in one cycle.

The coefficient buffer 308 may be configured to provide the plurality of weights in an order that comprises a first set of weights and a last set of weights; and if there are more windows than the total number of multipliers in the convolution engines the coefficient buffer may be configured to provide the first set of weights again to the convolution engines after it has provided the last set of weights to the convolution engines. For example if there are only two sets of weights that represent first and second filters respectively and the filter weights that represent the first filter are to be provided first, the coefficient buffer 308 may be configured to provide a set of weights that represent the first filter to all convolution engines 302 in a first cycle; provide a set of weights that represent a second filter to all convolution engines 302 in the second cycle; and provide the set of weights that represent the first filter to all convolution engines 302 in a third cycle etc. This means that in any cycle all convolution engines 302 receive the same part of a filter, but, as will be described in more detail below, different windows or different parts of a window.

Providing the same set of weights to all the convolution engines each cycle may reduce the output bandwidth required by the coefficient buffer because the coefficient buffer needs to output one set of weights per cycle. Providing the same set of weights to all convolution engines each cycle may also reduce the power consumed by the coefficient buffer 308 in fetching or reading the weights.

Although the coefficient buffer 308 is shown as a single module the coefficient buffer 308 may be implemented by a plurality of coefficient buffers that each form a bank, for example.

In some cases, the hardware implementation 300 may also comprise a coefficient buffer controller (not shown) which may be configured to obtain the plurality of weights related to a particular convolution layer (or fully connected layer) of a DNN to be processed from external memory (not shown) via a memory interface (not shown) and store the received weights in the coefficient buffer 308. The weights may be stored in a predetermined order in the external memory which is replicated in the coefficient buffer so that the coefficient buffer has to merely read and output the weights in the order stored in the coefficient buffer 308. The external memory may be considered as a separate module to the hardware implementation 300 or may be considered to be part of, or integrated with, the hardware implementation 300. Whether or not the coefficient buffer controller obtains all or a portion of the weights related to a particular convolution layer (or fully connected layer) of a DNN to be processed may depend on the size of the coefficient buffer 308. For example, if the coefficient buffer 308 is not large enough to hold all of the weights for a particular layer then the weights may be divided into portions which are each processed by the hardware implementation 300 separately.

Figure 5:
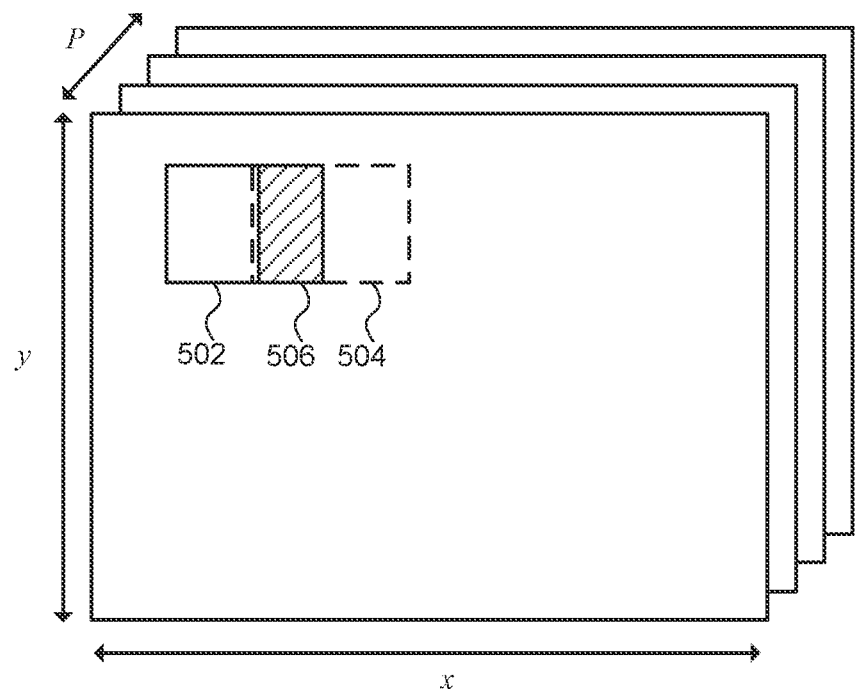
FIG. 5 is a schematic diagram illustrating overlapping windows.

The input buffer 310 comprises memory (not shown) to store a plurality of input data values related to a convolution layer (or fully connected layer) of a DNN and hardware logic (not shown) to provide the input data values to the convolution engines 302 for processing in a predetermined order over a plurality of cycles. The plurality of input data values may comprise all of the input data values related to the convolution layer or only a portion of the input data values related to a convolution layer. In the examples described herein the input buffer 310 is configured to provide each convolution engine 302 a different set of input data values each cycle. For example, in one cycle, the convolution engine 302 may provide a set of input data values that represent all or a portion of a first window to the first convolution engine 302, provide a set of input data values that represent all or a portion of a second window to the second convolution engine 302, provide a set of input data values that represent all or a portion of a third window to the third convolution engine 302, and provide a set of input data values that represent all or a portion of a fourth window to the fourth convolution engine 302. In some cases, the sets of input data values provided to the convolution engines in a cycle may relate to horizontally adjacent windows. Windows are said to be horizontally adjacent windows if they have the same 'y' coordinates (e.g. with respect to FIG. 2). For example, FIG. 5 illustrates two windows 502 and 504 which are horizontally adjacent as they have the same 'y' coordinates.

In some cases, the input buffer 310 may be configured to supply the same sets of input data values to the convolution engines 302 in multiple consecutive cycles so that multiple filters are applied to the same sets of input data values before new sets of input data values are provided to the convolution engines 302. For example, in a first cycle the input buffer 310 may be configured to provide a set of input data values representing window 1 to the first convolution engine, a set of input data values representing window 2 to the second convolution engine, a set of input data values representing window 3 to the third convolution engine, and a set of input data values representing window 4 to the fourth convolution engine; and in a second cycle the input buffer 310 may be configured to provide the set of input data values representing window 1 to the first convolution engine, the set of input data values representing window 2 to the second convolution engine, the set of input data values representing window 3 to the third convolution engine, and the set of input data values representing window 4 to the fourth convolution engine.

The input buffer 310 may be configured to provide the same sets of input data values to the convolution engines over multiple cycles by holding the output data steady over multiple cycles. The number of consecutive cycles that the output data may be held may be based on the number of different filters that are to be applied to the input data. For example, if there are 128 filters that are to be applied to the input data then new sets of input data values may be provided to the convolution engines in one cycle and held for the next 127 cycles so that each of the 128 filters are applied to the sets of input data values before new sets of input data values are provided to the convolution engines.

Providing the same sets of input data values to the convolution engines for multiple consecutive cycles reduces the number of times the input buffer fetches or reads the same set of input data values which may reduce the power consumption of the input buffer. It also allows the input buffer 310 to quickly provide the sets of input data values to the convolution engines each cycle; and provides more time for the input buffer 310 to read or fetch the next sets of input data values. Specifically, where the coefficient buffer 308 reads or fetches a new set of weights per cycle, the input buffer only reads or fetches new sets of input data values every R cycles where R is an integer greater than or equal to two. Thus the input buffer 310 has R cycles to fetch the next sets of input data values. In some cases R is the number of different filters to be applied to the input data. It can be beneficial to arrange the coefficient buffer and the input buffer to work in this way as the input data is typically more complex to fetch than the weights. Specifically, as described above the weights can be stored in the order in which they are to be processed by (and thus sent to) the convolution engines which allows the coefficient buffer to simply read or fetch the next set of weights in the coefficient buffer each cycle. Since the input data values typically form or represent a three-dimensional volume they cannot be stored in the order in which they are to be processed.

The order in which the input data values are provided to the convolution engines may be determined in advance, by for example, a software tool and then the input buffer 310 may be configured with information that enables it to provide the input data values to the convolution engines in the determined order. For example, the software tool may provide the input buffer 310 with the dimensions of the input data (e.g. x×y×P of FIG. 2), the convolution window size (e.g. n×m×P in FIG. 2) and the step sizes (s and t in FIG. 2). The input buffer 310 may then be configured to iterate through the convolution windows in a fixed hardcoded order and assign them to the convolution engines. Where the size of the convolution windows (e.g. the number of input data values in the convolution windows) exceeds the number of multipliers in the convolution engines the input buffer 310 the input data values for a window may be provided to the convolution engines over a plurality of cycles. In these cases the input buffer 310 may be configured to output the input data values of the windows over the plurality of cycles in a fixed hardcoded order.

In some cases, as shown in FIG. 5, when there is some overlap 506 between horizontally adjacent windows 502, 504 (i.e. the horizontal step size s (as shown in FIG. 2) is less than the window width m (as shown in FIG. 2)) the input buffer 310 may be configured to not re-read or fetch the portion of a subsequent window that overlaps with a previously read or fetched window. Instead that portion of the window can be obtained from the data for the previously read window. For example, the input buffer 310 may be configured to store or cache the K most recent sets of input data values read or fetched from memory, where K is an integer equal to or greater than 2, and if a subsequent set of input data values relates to a window that overlaps with the window associated with a set of input data values stored in the cache then the overlapping portion is not read or fetched from memory but is obtained from the cache. This can further reduce the power consumed by the input buffer 310 in reading or fetching the sets of input data values for the convolution engines 302.

Although the input buffer 310 is shown in FIG. 3 as a single module the input buffer 310 may be implemented by a plurality of input buffers that each form a bank, for example.

In some cases, the hardware implementation 300 may also comprise an input buffer controller (not shown) which may be configured to obtain the plurality of input data values related to a particular convolution layer (or fully connected layer) of a DNN from external memory (not shown) via a memory interface (not shown) and store the received input data values in the input buffer 310. The input data values of a layer may be stored in a predetermined order in the external memory which is replicated in the input buffer. The predetermined order may have been determined by a software tool.

Figure 6:
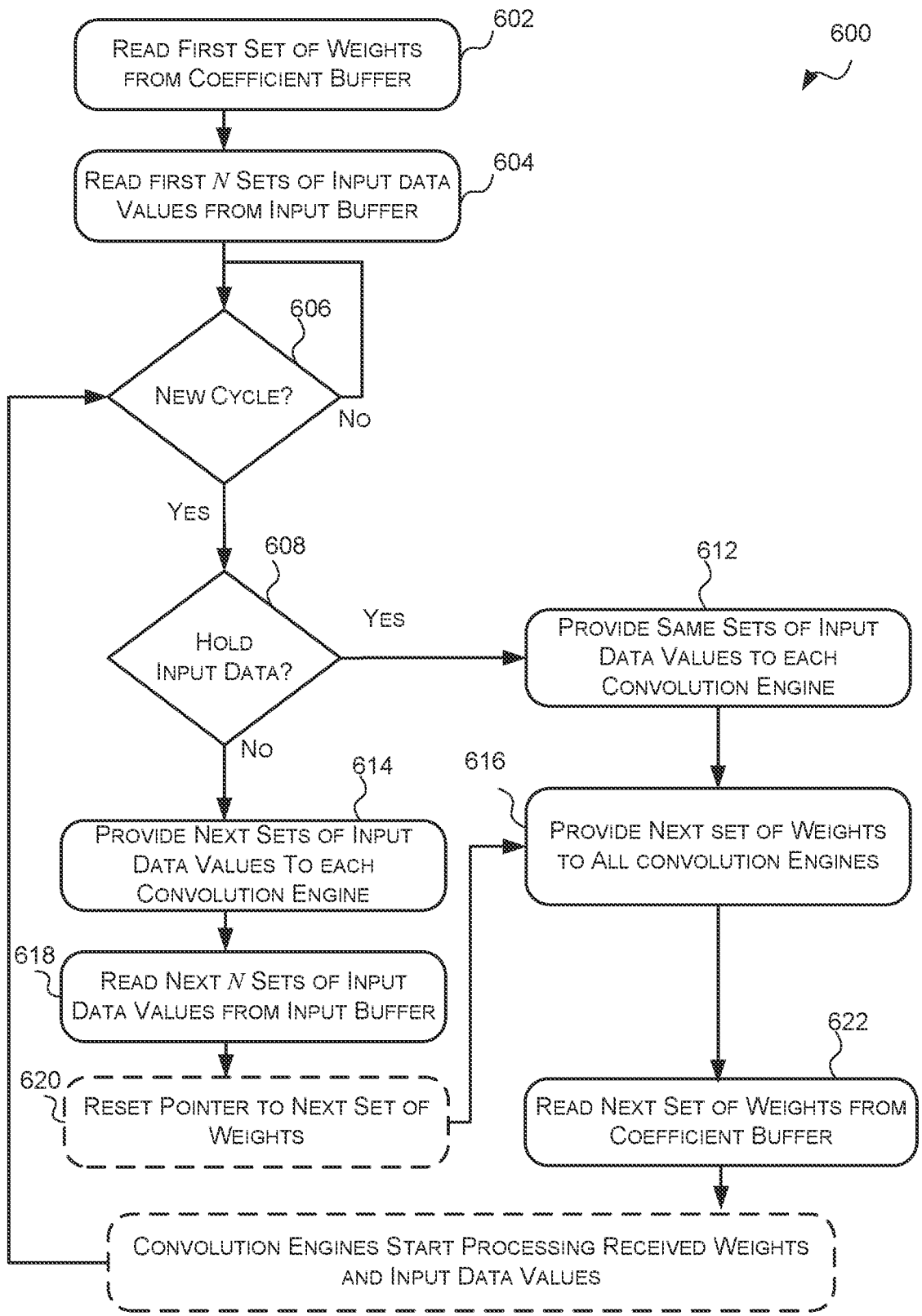
FIG. 6 is a flow diagram of an example method of providing weights and input data values to a plurality of convolution engines.

Reference is now made to FIG. 6 which illustrates an example method 600 for providing weights and input data values to a plurality of convolution engines which may be implemented by the hardware implementation 300 of FIG. 3. In this method 600, the same set of weights are provided to each convolution engine 302 each cycle, but different sets of input data values are provided to each convolution engine 302 each cycle; and the same sets of input data values are provided to each convolution engine 302 for R consecutive cycles where R is an integer greater than or equal to two. In some cases R is the number of filters to be applied to the input data.

The method 600 begins at blocks 602 and 604 where the method 600 is initialised. In particular, at block 602 the coefficient buffer 308 reads the first set of weights to be processed from the memory of the coefficient buffer. In some cases the weights are stored in the coefficient buffer 308 in the order in which they are provided to the convolution engines. In these cases, the first set of weights may be the first set of weights stored in the coefficient buffer. At block 604, the input buffer 310 reads the first N sets of input data values from the memory of the input buffer 310 where N is the number of convolution engines 302. The set of weights represents all or a portion of a filter to be applied to the input data, and each set of input data values represents all or a portion of a window of the input data. The method 600 then proceeds to block 606 where a determination is made as to whether a new cycle has occurred. The term cycle is used herein to mean a processing cycle of the hardware implementation of the convolution layer of a DNN. A cycle may be equivalent to a clock cycle but does not necessarily have to be. Once a new cycle has occurred the method 600 proceeds to block 608.

At block 608, the input buffer 310 determines whether the same sets of input data values provided to the convolution engines 302 in the last cycle are to be provided to the convolution engines 302 in the current cycle. As described above, in some cases the input buffer 310 may be configured to determine whether the same sets of input data values provided to the convolution engines 302 in the last cycle are to be provided to the convolution engines 302 in the current cycle based on a number of filters R to be applied to the input data. For example, in these cases, the input buffer 310 may be configured to count the number of times particular sets of input data values have been provided to the convolution engines 302 and once the counted number of times equals R then new sets of input data values are provided to the convolution engines. If it is determined that the same sets of input data values provided to the convolution engines 302 in the last cycle are to be provided in the current cycle then the method proceeds to block 612. If, however, it is determined that different sets of input data values are to be provided to the convolution engines 302 then the method 600 proceeds to block 614.

At block 612, the input buffer 310 provides the same sets of input data values that were provided to the convolution engines in the last cycle to the convolution engines. In other words the input buffer 310 'holds' the output. The method 600 then proceeds to block 616.

At block 614, the input buffer 310 provides a different one of the most recent N sets of input data values read from the memory of the input buffer 310 to each convolution engine 302. As a result, in any cycle the convolution engines 302 receive input data values related to different windows. Once new sets of input data values have been provided to the convolution engines 302 the method proceeds to block 618.

At block 618, the input buffer 310 reads or fetches the next N sets of input data values from the memory of the input buffer 310. Although the sets of input data values provided to the convolution engines 302 in the current cycle may be used for a number of subsequent cycles it may take several cycles to read or fetch all of the new sets of input data values so the read or fetch is initiated as soon as the new sets of input data values are provided. The method 600 then proceeds to block 620 where the coefficient buffer reconfigures itself so that the next set of weights will be the first set of weights corresponding to the first filter. Specifically, once the weights of all of the filters have been provided to the convolution engines the coefficient buffer starts again with the first set of weights corresponding to the first filter. Once the coefficient buffer has reconfigured itself so that the next set of weights is the first set of weights corresponding to the first filter the method 600 proceeds to block 616.

At block 616, the coefficient buffer 308 provides the most recent set of weights read from memory to all convolution engines 302 for processing. As a result, all convolution engines 302 receive the same set of weights in a cycle. Once the coefficient buffer 308 has provided the most recent set of weights read from memory to the convolution engines 302, the method 600 proceeds to block 622 where the coefficient buffer 308 reads or fetches the next set of weights to be processed by the convolution engines from the memory of the coefficient buffer 308. Where the weights are stored in the coefficient buffer 308 in the order in which they are to be processed by the convolution engines then the coefficient buffer 308 may be configured to read the next set of weights in memory. Once the coefficient buffer 308 has read or fetched the next set of weights to be processed by the convolution engines then the method 600 returns to block 606 where the coefficient buffer 308 and the input buffer 310 wait for the next cycle to occur.

Once a convolution engine receives a set of input data values and a set of weights the convolution engines start performing a convolution calculation on the input data vales and weights. Where the convolution engines are configured to perform the convolution calculations via a pipeline it may take several cycles to produce the results of a convolution calculation for a specific pair of weights and input data values, however each convolution engine will be ready to receive a new pair of weights and input data values in the next cycle.

Reference is now made to FIG. 7 which illustrates an example of the weights and input data values which may be provided to each of the convolution engines 302 over a plurality of cycles. In this example there are three filter (F1, F2, F3) which are applied to each of eight windows (W1, W2, W3, W4, W5, W6, W7, W8), and there are four convolution engines (CE1, CE2, CE3, CE4). Each set of weights represents one of the three filters (F1, F2, F3) and each set of input data values represents one of the eight windows (W1, W2, W3, W4, W5, W6, W7, W8). It can be seen from FIG. 7 that (i) in each cycle all convolution engines (CE1, CE2, CE3, CE4) receive the same set of weights (e.g. in cycle 1 all of the convolution engines receive a set of weights that represent the first filter (F1) and in cycle 2 all of the convolution engines receive a set of weights that represent the second filter (F2)); (ii) in each cycle each of the convolutions receives a different set of input data values (e.g. in cycle 1 the first convolution engine (CE1) receives a set of input data values that represent the first window (W1), the second convolution engine (CE2)

receives a set of input data values that represent the second window (W2), the third convolution engine (CE3) receives a set of input data values that represent the third window (W3), and the fourth convolution engine (CE4) receives a set of input data values that represent the fourth window (W4)); and (iii) the convolution engines receive a new set of input data values every three cycles since there are three filters. Accordingly in this example the convolution engines receive the same sets of input data values in three consecutive cycles so that each of the three filters can be applied to the sets of input data values. It will be evident to the person of skill in the art that this is an example only and that in other examples there may be another number of filters, windows and/or convolution engines, and/or the filters and windows may be provided to the convolution engines in another order.

In some cases, the hardware implementation of a convolution layer of a DNN 300 described herein may be implemented in a hardware implementation of a DNN. A hardware implementation of a DNN comprises hardware logic configured to process input data to the DNN in accordance with the layers of the DNN. Specifically, a hardware implementation comprises hardware logic configured to process the input data to each layer in accordance with that layer and generate output data for each layer which either becomes the input data to another layer or becomes the output of the DNN. For example, if a DNN comprises a convolution layer followed by an activation layer the hardware implementation for that DNN comprises hardware logic configured to perform a convolution on the input data to the DNN using the weights associated with that convolution layer to produce output data for the convolution layer, and hardware logic configured to apply an activation function to the input data to the activation layer (i.e. the output of the convolution layer) to generate output data for the DNN.

Example Hardware Implementation of DNN

Figure 8:
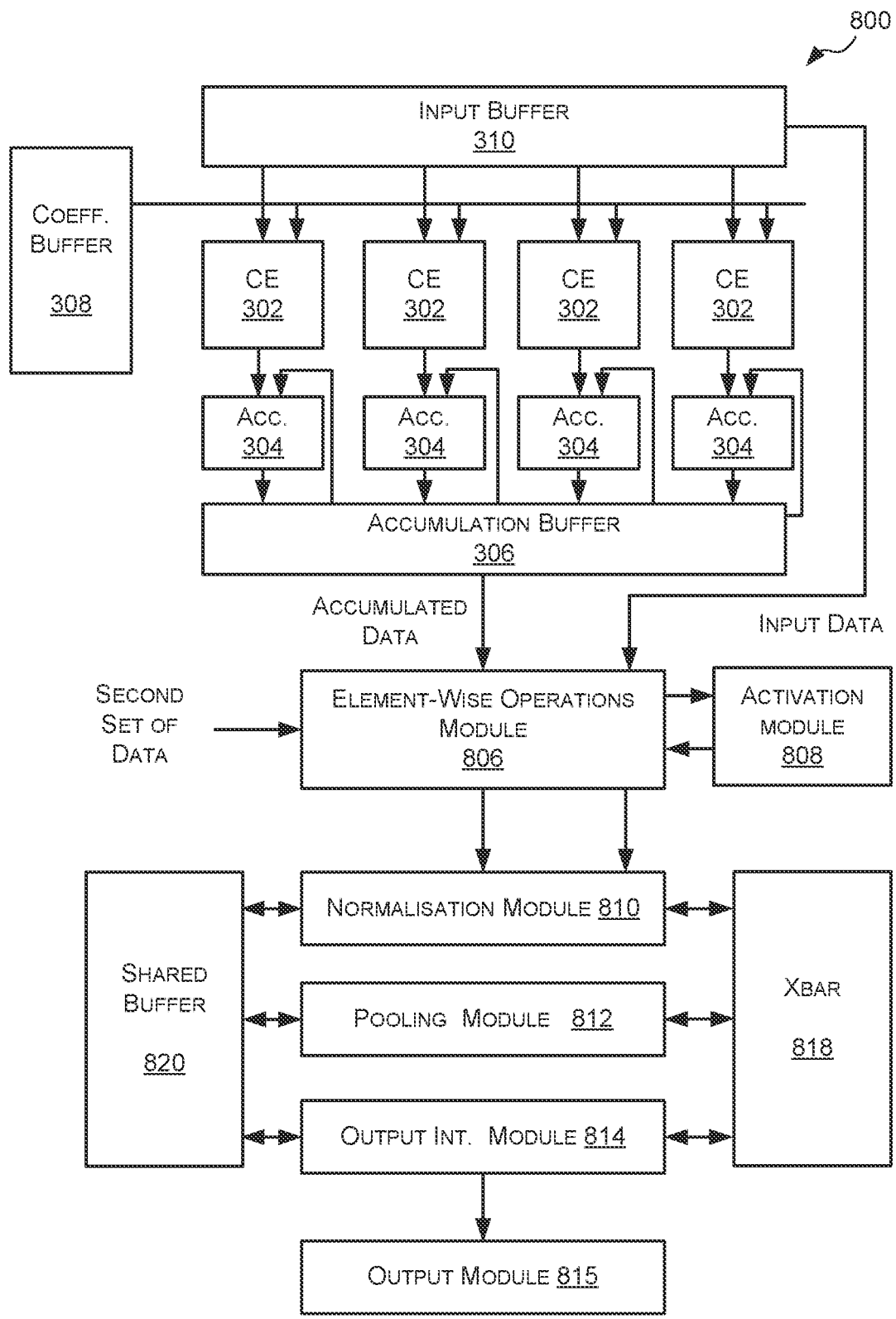
FIG. 8 is a block diagram of an example hardware implementation of a DNN in which the hardware implementation of a convolution layer of a DNN of FIG. 3 has been implemented.

Reference is now made to FIG. 8 which shows an example hardware implementation of a DNN 800 in which the hardware implementation of a convolution layer of a DNN described herein may be implemented. The hardware implementation of a DNN 800 of FIG. 8 is configured to compute the output of a DNN through a series of hardware passes (which also may be referred to as processing passes) wherein during each hardware pass the hardware implementation receives at least a portion of the input data for a layer of the DNN and processes the received input data in accordance with that layer (and optionally in accordance with one or more following layers) to produce processed data. The processed data is either output to memory for use as input data for a subsequent hardware pass or output as the output of the DNN. The number of layers that the hardware implementation can process during a single hardware pass may be based on the size of the data, the hardware implementation and the order of the layers. For example, where the hardware implementation comprises hardware to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN.

The example hardware implementation of a DNN 800 of FIG. 8 comprises the input buffer 310, coefficient buffer 308, convolution engines 302, accumulators 304 and accumulation buffer 306 of FIG. 3. The hardware implementation of a DNN 800 also comprise an element-wise operations module 806, an activation module 808, a normalisation module 810, a pooling module 812, an output interleave module 814 and an output module 815. Each module or engine implement or process all or a portion of one or more types of layers. Specifically, together the convolution engines 302, accumulators 304 and the accumulation buffer 306 implement or process a convolution layer or a fully connected layer. The activation module 808 processes or implements an activation layer. The normalisation module 810 processes or implements a normalisation layer. The pooling module 812 implements a pooling layer and the output interleave module 814 processes or implements an interleave layer.

The input buffer 310, coefficient buffer 308, convolution engines 302, accumulators 304 and accumulation buffer 306 work as described above with respect to FIG. 3. The accumulation buffer 306 also outputs the accumulated result to the element-wise operations module 806 which may or may not operate on the accumulated result depending on whether an element-wise layer is to be processed during the current hardware pass.

The element-wise operations module 806 is configured to receive either the input data for the current hardware pass (e.g. when a convolution layer is not processed in the current hardware pass) or the accumulated result from the accumulation buffer 306 (e.g. when a convolution layer is processed in the current hardware pass). The element-wise operations module 806 may either process the received input data or pass the received input data to another module (e.g. the activation module 808 and/or or the normalisation module 810) depending on whether an element-wise layer is processed in the current hardware pass and/or depending whether an activation layer is to be processed prior to an element-wise layer. When the element-wise operations module 806 is configured to process the received input data the element-wise operations module 806 performs an element-wise operation on the received data (optionally with another data set (which may be obtained from external memory)). The element-wise operations module 806 may be configured to perform any suitable element-wise operation such as, but not limited to add, multiply, maximum, and minimum. The result of the element-wise operation is then provided to either the activation module 808 or the normalisation module 810 depending on whether an activation layer is to be processed subsequent the element-wise layer or not.

The activation module 808 is configured to receive one of the following as input data: the original input to the hardware pass (via the element-wise operations module 806) (e.g. when a convolution layer is not processed in the current hardware pass); the accumulated data (via the element-wise operations module 806) (e.g. when a convolution layer is processed in the current hardware pass and either an element-wise layer is not processed in the current hardware pass or an element-wise layer is processed in the current hardware pass but follows an activation layer). The activation module 808 is configured to apply an activation function to the input data and provide the output data back to the element-wise operations module 806 where it is forwarded to the normalisation module 810 directly or after the element-wise operations module 806 processes it. In some cases, the activation function that is applied to the data received by the activation module 808 may vary per activation layer. In these cases, information specifying one or more properties of an activation function to be applied for each activation layer may be stored (e.g. in memory) and the relevant information for the activation layer processed in a particular hardware pass may be provided to the activation module 808 during that hardware pass.

In some cases, the activation module 808 may be configured to store, in entries of a lookup table, data representing the activation function. In these cases, the input data may be used to lookup one or more entries in the lookup table and output values representing the output of the activation function. For example, the activation module 808 may be configured to calculate the output value by interpolating between two or more entries read from the lookup table.

In some examples, the activation module 808 may be configured to operate as a Rectified Linear Unit (ReLU) by implementing a ReLU function. In a ReLU function, the output element $y_{i,j,k}$ is calculated by identifying a maximum value as set out in equation (1) wherein for x values less than 0, y=0:

$$y_{i,j,k} = f(x_{i,j,k}) = max\{0, x_{i,j,k}\} \quad (1)$$

In other examples, the activation module 808 may be configured to operate as a Parametric Rectified Linear Unit (PReLU) by implementing a PReLU function. The PReLU function performs a similar operation to the ReLU function. Specifically, where $w_1$, $w_2$, $b_1$, $b_2 \in \mathbb{R}$ are constants, the PReLU is configured to generate an output element $y_{i,j,k}$ as set out in equation (2):

$$y_{i,j,k} = f(x_{i,j,k}; w_1, w_2, b_1, b_2) = max\{(w_1 * x_{i,j,k} + b_1), (w_2 * x_{i,j,k} + b_2)\} \quad (2)$$

The normalisation module 810 is configured to receive one of the following as input data: the original input data for the hardware pass (via the element-wise operations module 806) (e.g. when a convolution layer is not processed in the current hardware pass and neither an element-wise layer nor an activation layer is processed in the current hardware pass); the accumulation output (via the element-wise operations module 806) (e.g. when a convolution layer is processed in the current hardware pass and neither an element-wise layer nor an activation layer is processed in the current hardware pass); and the output data of the element-wise operations module and/or the activation module. The normalisation module 810 then performs a normalisation function on the received input data to produce normalised data. In some cases, the normalisation module 810 may be configured to perform a Local Response Normalisation (LRN) Function and/or a Local Contrast Normalisation (LCN) Function. However, it will be evident to a person of skill in the art that these are examples only and that the normalisation module 810 may be configured to implement any suitable normalisation function or functions. Different normalisation layers may be configured to apply different normalisation functions.

The pooling module 812 may receive the normalised data from the normalisation module 810 or may receive the input data to the normalisation module 810 via the normalisation module 810. In some cases, data may be transferred between the normalisation module 810 and the pooling module 812 via an XBar 818. The term "XBar" is used herein to refer to a simple hardware module that contains routing logic which connects multiple modules together in a dynamic fashion. In this example, the XBar may dynamically connect the normalisation module 810, the pooling module 812 and/or the output interleave module 814 depending on which layers will be processed in the current hardware pass. Accordingly, the XBar may receive information each pass indicating which modules 810, 812, 814 are to be connected.

The pooling module 812 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave module 814 may receive the normalised data from the normalisation module 810, the input data to the normalisation function (via the normalisation module 810), or the pooled data from the pooling module 812. In some cases, the data may be transferred between the normalisation module 810, the pooling module 812 and the output interleave module 814 via an XBar 818. The output interleave module 814 is configured to perform a rearrangement operation to produce data that is in a predetermined order. This may comprise sorting and/or transposing the received data. The data generated by the last of the layers is provided to the output module 815 where it is converted to the desired output format for the current hardware pass.

The normalisation module 810, the pooling module 812, and the output interleave module 814 may each have access to a shared buffer 820 which can be used by these modules 810, 812 and 814 to write data to and retrieve data from. For example, the shared buffer 820 may be used by these modules 810, 812, 814 to rearrange the order of the received data or the generated data. For example, one or more of these modules 810, 812, 814 may be configured to write data to the shared buffer 820 and read the same data out in a different order. In some cases, although each of the normalisation module 810, the pooling module 812 and the output interleave module 814 have access to the shared buffer 820, each of the normalisation module 810, the pooling module 812 and the output interleave module 814 may be allotted a portion of the shared buffer 820 which only they can access. In these cases, each of the normalisation module 810, the pooling module 812 and the output interleave module 814 may only be able to read data out of the shared buffer 820 that they have written in to the shared buffer 820.

As described above the modules of the hardware implementation 800 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the hardware implementation may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first hardware convolution needs to be written out to memory before it can be used as an input to the second. In each of these hardware passes only the modules, components or engines relevant to a convolution layer, such as the convolution engines 302, accumulators 304, and the accumulation buffer 306, may be used or active.

Although the hardware implementation 800 of FIG. 8 illustrates a particular order in which the modules, engines etc. are arranged and thus how the processing of data flows through the processing module, it will be appreciated that this is an example only and that in other examples the modules, and engines may be arranged in a different manner. Furthermore, other processing modules may implement additional or alternative types of DNN layers and thus may comprise different modules, engines etc.

Figure 9:
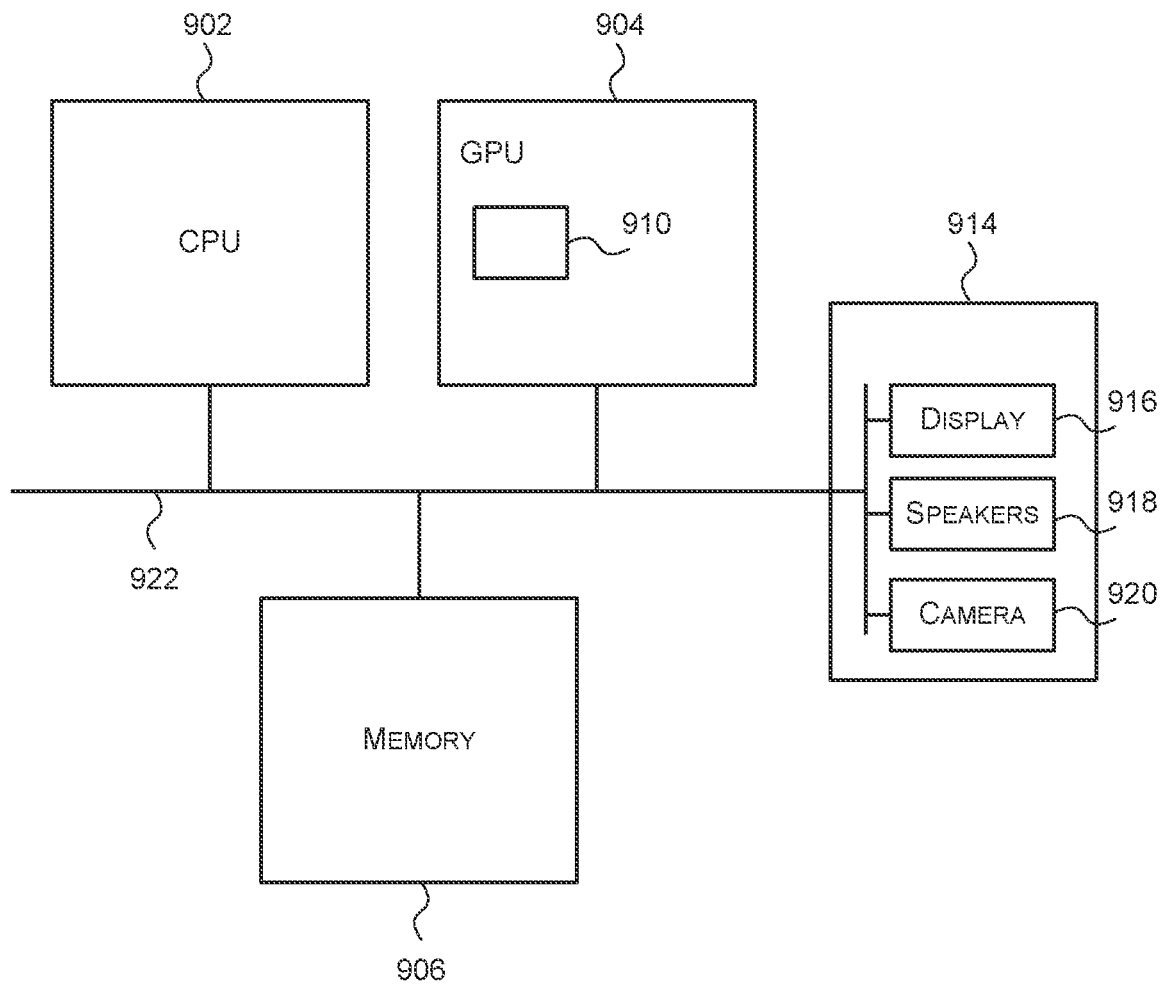
FIG. 9 is a block diagram of an example computer system in which the hardware implementation of the DNN is implemented.

FIG. 9 shows a computer system in which the hardware implementations for a DNN described herein may be implemented. The computer system comprises a CPU 902, a GPU 904, a memory 906 and other devices 914, such as a display 916, speakers 918 and a camera 920. A hardware implementation of a DNN 910 (corresponding to the hardware implementation of a DNN 800) may be implemented on the GPU 904, as shown in FIG. 9. In other examples, the hardware implementation of a DNN 910 may be implemented independent from the CPU or the GPU and may have a separate connection to a communications bus 922. In some examples, there may not be a GPU and the CPU may provide control information to the hardware implementation of a DNN 910. The components of the computer system can communicate with each other via the communications bus 922.

The hardware implementation of a convolution layer of a DNN 300 of FIG. 3 and the hardware implementation of a DNN 800 of FIG. 8 are shown as comprising a number of functional blocks. This is schematic only and is not intended to define a strict division between different logic elements of such entities. Each functional block may be provided in any suitable manner. It is to be understood that intermediate values described herein as being formed by a hardware implementation of a DNN, a hardware implementation of a convolution layer of a DNN, or a processing module need not be physically generated by the hardware implementation of a DNN, the hardware implementation of a convolution layer of a DNN, or the processing module at any point and may merely represent logical values which conveniently describe the processing performed by the hardware implementation of a DNN, the hardware implementation of a convolution layer of a DNN, or the processing module between its input and output.

The hardware implementations of a DNN described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware implementation of a DNN or a hardware implementation of a convolution layer of a DNN described herein. An integrated circuit definition dataset may be, for example, an integrated circuit description.

Therefore, there may be provided a method of manufacturing, at an integrated circuit manufacturing system, a hardware implementation of a DNN or a hardware implementation of a convolution layer of a DNN as described herein. Furthermore, there may be provided an integrated circuit definition dataset that, when processed in an integrated circuit manufacturing system, causes the method of manufacturing a hardware implementation of a DNN or a hardware implementation of a convolution layer of a DNN to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation of a convolution layer of a DNN or a hardware implementation of a DNN will now be described with respect to FIG. 10.

Figure 10:
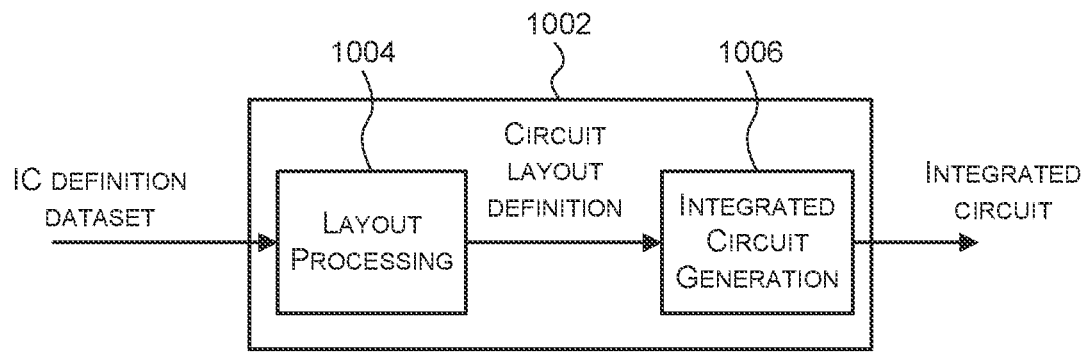
FIG. 10 is a block diagram of an example integrated circuit manufacturing system for generating an integrated circuit embodying a hardware implementation of a convolutional layer of a DNN or a hardware implementation of a DNN as described herein.

FIG. 10 shows an example of an integrated circuit (IC) manufacturing system 1002 which is configured to manufacture a hardware implementation of a convolution layer of a DNN or a hardware implementation of a DNN as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a hardware implementation of a convolution layer of a DNN or a hardware implementation of a DNN as described in any of the examples herein), process the IC definition dataset, and generate an IC according to the IC definition dataset (e.g. which embodies a hardware implementation of a convolutional layer of a DNN or a hardware implementation of a DNN as described in any of the examples herein). The processing of the IC definition dataset configures the IC manufacturing system 1002 to manufacture an integrated circuit embodying a hardware implementation of a convolutional layer of a DNN or a hardware implementation of a DNN as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation of a DNN or a hardware implementation of a convolution layer of a DNN without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An input buffer for a convolution layer of a deep neural network, configured to:
  store in a memory of the input buffer a plurality of input data values for the convolution layer;
  provide the plurality of input data values to a plurality of convolution engines over a plurality of cycles wherein in any cycle each convolution engine is provided with a different set of input data values relative to the other convolution engines;
  prior to providing a set of input data values of the plurality of input data values to a convolution engine for a first time, fetch that set of input data values from the memory of the input buffer; and
  store the K most recent sets of input data values fetched from the memory of the input buffer in a cache, wherein K is an integer greater than or equal to two, and if a portion of a next set of input data values to be fetched is in the cache that portion of the next set of input data values is not fetched from the memory of the input buffer and is obtained from the cache.

2. The input buffer of claim 1, wherein the plurality of input data values represents a three-dimensional volume and each set of input data values represents all or a portion of a window of that three-dimensional volume.

3. The input buffer of claim 2, wherein the different sets of input data values that are provided to the convolution engines in a cycle represent all or a portion of horizontally adjacent windows.

4. The input buffer of claim 1, wherein the input buffer is configured to provide the same sets of input data values to the plurality of convolution engines in multiple consecutive cycles.

5. The input buffer of claim 4, wherein the input buffer is configured to provide the same sets of input data values to the plurality of convolution engines in multiple consecutive cycles by holding the data output from the input buffer steady over the multiple consecutive cycles.

6. The input buffer of claim 4, wherein the input buffer is configured to provide the same sets of inputs data values to the plurality of convolution engines for R consecutive cycles, wherein R is a number of different filters to be applied to the plurality of input data values.

7. A hardware implementation of a convolution layer of a deep neural network comprising the input buffer as set forth in claim 1.

8. The hardware implementation of claim 7, further comprising the plurality of convolution engines, each convolution engine comprising hardware logic configured to receive in each of the plurality of cycles a set of weights and a set of input data values, and perform a multiply accumulate operation on the set of weights and the set of input data values.

9. The hardware implementation of claim 8, wherein each convolution engine comprises:
  a plurality of multipliers each configured to multiply a weight and an input data value to produce a multiplication output value, and
  a plurality of adders following the plurality of multipliers that form an adder tree to calculate a sum of the multiplication output values.

10. The hardware implementation of claim 8, further comprising a plurality of accumulators configured to add the output of one of the convolution engines to a previous convolution engine output.

11. The hardware implementation of claim 7, further comprising a coefficient buffer configured to:
  store a plurality of weights for the convolution layer, and
  provide the plurality of weights to the plurality of convolution engines over the plurality of cycles wherein in any cycle all of the convolution engines are provided with the same set of weights.

12. The hardware implementation of claim 11, wherein the coefficient buffer is configured to provide the plurality of weights to the convolution engines in a predetermined order comprising a first set of weights and a last set of weights.

13. A method of providing data to a plurality of convolution engines of a hardware implementation of a convolution layer of a deep neural network, each convolution engine comprising hardware logic configured to perform a multiply accumulate operation on a set of weights and a set of input data values, the method comprising, at an input buffer:
  storing a plurality of input data values for the convolution layer in a memory of the input buffer;
  providing the plurality of input data values in the memory of the input buffer to the convolution engines over a plurality of cycles, wherein in any cycle each convolution engine is provided with a different set of input data values relative to the other convolution engines;
  prior to providing a set of input data values of the plurality of input data values to a convolution engine for a first time, fetching the set of input data values from the memory of the input buffer;
  storing the K most recent sets of input data values fetched from the memory of the input buffer in a cache, wherein K is an integer greater than or equal to two;
  prior to fetching a next set of input data values from the memory of the input buffer, determining whether a portion of the next set of input data values is in the cache; and
  in response to determining that a portion of the next set of input data values is in the cache, not fetching that portion of the next set of input data values from the memory of the input buffer and obtaining that portion of the next set of input data values from the cache.

14. The method of claim 13, wherein the plurality of input data values represents a three-dimensional volume and each set of input data values represents all or a portion of a window of that three-dimensional volume.

15. The method of claim 14, wherein the different sets of input data values that are provided to the convolution engines in a same cycle represent all or a portion of horizontally adjacent windows.

16. The method of claim 13, wherein in at least one cycle the convolution engines are provided the same set of input data values that were provided in the previous cycle.

17. The method of claim 13, wherein the same sets of input data values are provided to the convolution engines for R consecutive cycles, wherein R is a number of filters to be applied to the plurality of input data values.

18. The method of claim 13, further comprising, at a coefficient buffer:
  storing a plurality of weights for the convolution layer in the coefficient buffer; and providing the plurality of weights in the coefficient buffer to the convolution engines over the plurality of cycles, wherein in any cycle all the convolution engines are provided a same set of weights.

19. A non-transitory computer readable storage medium having stored thereon computer readable instructions that, when executed at a computer system, cause the computer system to perform the method as set forth in claim 13.

20. A non-transitory computer readable storage medium having stored thereon a computer readable dataset description of the input buffer as set forth in claim 1 that, when processed in an integrated circuit manufacturing system, causes the integrated circuit manufacturing system to manufacture an integrated circuit embodying the input buffer.

\* \* \* \* \*